US011657644B2

(12) United States Patent
Hougen et al.

(10) Patent No.: US 11,657,644 B2
(45) Date of Patent: *May 23, 2023

(54) AUTOMATIC RULER DETECTION

(71) Applicant: IDEMIA IDENTITY & SECURITY USA LLC, Billerica, MA (US)

(72) Inventors: Darrell Hougen, Littleton, CO (US); Peter Zhen-Ping Lo, Mission Viejo, CA (US)

(73) Assignee: IDEMIA IDENTITY & SECURITY USA LLC, Billerica, MA (US)

( * ) Notice: Subject to any disclaimer, the term of this patent is extended or adjusted under 35 U.S.C. 154(b) by 247 days.

This patent is subject to a terminal disclaimer.

(21) Appl. No.: 16/895,493

(22) Filed: Jun. 8, 2020

(65) Prior Publication Data
US 2021/0124978 A1 Apr. 29, 2021

Related U.S. Application Data

(63) Continuation of application No. 16/222,755, filed on Dec. 17, 2018, now Pat. No. 10,679,094, which is a (Continued)

(51) Int. Cl.
*G06K 9/52* (2006.01)
*G06T 7/60* (2017.01)
(Continued)

(52) U.S. Cl.
CPC .............. *G06V 10/42* (2022.01); *G06T 7/60* (2013.01); *G06V 10/32* (2022.01);
(Continued)

(58) Field of Classification Search
CPC .......... G06K 2209/03; G06K 9/00067; G06K 9/4604; G06K 9/52; G06T 2207/30204; G06T 7/0042; G06T 7/60
(Continued)

(56) References Cited

U.S. PATENT DOCUMENTS 5,960,101 A 9/1999 Lo et al.
8,483,441 B2 7/2013 Yu et al.
(Continued)

OTHER PUBLICATIONS

Abhir Bhalerao et al. Ruler Detetion for Autoscaling Forensic Images, University of Warwicj, Coventry UK, Jun. 7, 2013, pp. 1-23 (Year: 2013).*

(Continued)

*Primary Examiner* — Michael J Hess
*Assistant Examiner* — Naod W Belai
(74) *Attorney, Agent, or Firm* — Brian Gordaychik

(57) ABSTRACT

In some implementations, a method includes: receiving, from the camera, a sample image that includes a fingerprint and a mensuration reference device, where the sample image is associated with a resolution; identifying (i) a plurality of edge candidate groups within the sample image, and (ii) a set of regularity characteristics associated with each of the plurality of edge candidate groups; determining that the associated set of regularity characteristics indicates the mensuration reference device; identifying a ruler candidate group, from each of the plurality of edge candidate groups, based at least on determining that the associated set of regularity characteristics indicates the mensuration reference device; computing a scale associated with the sample image based at least on extracting a set of ruler marks from the identified ruler candidate group; and generating, based at least on the scale associated with the sample image, a scaled image.

20 Claims, 8 Drawing Sheets

Related U.S. Application Data continuation of application No. 14/942,417, filed on Nov. 16, 2015, now Pat. No. 10,192,137.

(51) Int. Cl.
*G06V 10/42* (2022.01)
*G06V 10/32* (2022.01)
*G06V 40/12* (2022.01)
*G06V 10/44* (2022.01)

(52) U.S. Cl.
CPC .............. *G06V 40/1347* (2022.01); *G06T 2207/30204* (2013.01); *G06V 10/44* (2022.01); *G06V 2201/02* (2022.01)

(58) Field of Classification Search
USPC .......................................................... 348/77
See application file for complete search history.

(56) References Cited

U.S. PATENT DOCUMENTS

| | | | |
|---|---|---|---|
| 8,538,077 B2* | 9/2013 | Zitnick, III | G06V 10/451 |
| | | | 382/103 |
| 10,192,137 B2 | 1/2019 | Hougen et al. | |
| 10,679,094 B2 | 6/2020 | Hougen et al. | |
| 2017/0140199 A1 | 5/2017 | Hougen et al. | |
| 2017/0374372 A1* | 12/2017 | Liu | H04N 19/103 |
| 2019/0138840 A1 | 5/2019 | Hougen et al. | |
| 2020/0288145 A1* | 9/2020 | Chuang | H04N 19/11 |

OTHER PUBLICATIONS

Christopher and Gregson, "Detecting corners using the 'patchy' Hough transform," 1994 Proceedings of Canadian Conference on Electrical and Computer Engineering, 1994, pp. 576-579 vol. 2, doi: 10.1109/CCECE.1994.405817. (Year: 1994).*

Abhir Bhalerao et al. Ruler Deletion for Autoscaling Forensic Images, University of Warwicj, Coventry UK, dated Jun. 7, 2013, pp. 1-23.

* cited by examiner

AUTOMATIC RULER DETECTION

CROSS-REFERENCE TO RELATED APPLICATION

This application is a continuation application of U.S. application Ser. No. 16/222,755, filed Dec. 17, 2018 which is a continuation application of, and claims priority to, U.S. application Ser. No. 14/942,417, filed on Nov. 16, 2015, now U.S. Pat. No. 10,192,137.

FIELD

The present disclosure relates generally to fingerprint identification systems.

BACKGROUND

Pattern matching systems such as ten-print or fingerprint identification systems play a critical role in criminal and civil applications. For example, fingerprint identification is often used to identify and track suspects and in criminal investigations. Similarly, fingerprint verification is used in civil applications to prevent fraud and support other security processes.

SUMMARY

Typical fingerprint identification and matching operations using two images often require a determination of the resolution of the respective images. This may be accomplishing by placing reference objects such as rulers nearby a fingerprint during the image capture process. The resolution of the captured image may be manually determined by identifying the image locations of reference marks on the ruler and counting the number of marks between the image locations. However, such techniques are often very tedious and can be time consuming in real-world applications.

Accordingly, one innovative aspect described throughout this disclosure includes methods that automatically determine a scale associated with a sample image including a fingerprint, and rescales the sample image to a standard scale to reduce capture errors and otherwise improve the performance of fingerprint identification and matching operations using the sample image. For instance, a scaled image may be generated based on the sample image, which may be more efficiently and accurately processed by a fingerprint identification system.

Implementations may include one or more of the following features. For example, a system may include: a scanning device; and one or more computing devices including a processor and a memory coupled to said processor, where the memory includes computer-executable instructions that, when executed by said processor, cause the one or more computing device to perform operations. The operations may include: receiving, from the scanning device, a sample image that includes a region containing a fingerprint and a region containing a ruler or other mensuration reference device, where the sample image is associated with a first resolution; identifying a plurality of edge candidate groups within the sample image; testing for a set of regularity characteristics associated with each of the plurality of edge candidate groups; determining that the associated set of regularity characteristics indicates the mensuration reference device; identifying a ruler candidate group, from each of the plurality of edge candidate groups, based at least on determining that the set of regularity characteristics indicates the mensuration reference device; computing a scale associated with the sample image based at least on extracting a set of ruler marks from the identified ruler candidate group; and generating, based at least on the scale associated with the sample image, a scaled image; and providing the scaled image for output.

Other versions include corresponding systems, and computer programs, configured to perform the actions of the methods encoded on computer storage devices.

In some implementations, the operations include: computing a gradient image associated with the sample image; and computing the edge pixel map and the orientation map based at least on the gradient image.

In some implementations, the operations include: identifying a quality metric that defines a minimum level of gradient quality for the gradient image; determining a gradient quality value associated with the gradient image; and determining that the gradient value satisfies the quality metric.

One or more implementations may include the following optional features. For example, in some implementations, the operations include: computing an edge pixel map that includes a plurality of edge pixels from the sample image; generating an orientation map that defines an orientation for each edge pixel included within the plurality of edge pixels; and aggregating, based at least on the orientation for each edge pixel included within the plurality of edge pixels, the plurality of edge pixels into the plurality of edge candidate groups.

In some implementations, the operations include: computing an orientation histogram based at least on the orientation map; identifying a plurality of matching orientations within an interval centered at a peak of the orientation histogram; and generating one or more of the plurality of edge candidate groups using the edge pixels corresponding to the identified plurality of matching orientations.

In some implementations, the operations include: defining the interval based at least on the number of orientations represented within the orientation map.

In some implementations, the operations include: retrieving a plurality of ruler descriptions; and determining that the ruler candidate group includes a valid ruler based at least on the received plurality of ruler descriptions.

In some implementations, the operations include: extracting the set of ruler marks based at least on estimating a ruler orientation described in the identified ruler candidate group; performing a plurality of regularity tests on the extracted set of ruler marks; and removing a plurality of false marks from the set of ruler marks based at least on the plurality of regularity tests.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

In general, one innovative aspect described throughout this disclosure includes methods that automatically determine a scale associated with a sample image including a fingerprint, and rescales the sample image to a standard scale to reduce capture errors and otherwise improve the performance of fingerprint identification and matching operations using the sample image. For instance, a scaled image may be generated based on the sample image, which may be more efficiently and accurately processed by a fingerprint identification system.

In general, pattern matching systems, such as ten-print or fingerprint matching systems, play a critical role in many applications related to the identification of individuals, or the verification of the identity of individuals. In the public sector, such systems may be used to facilitate security or criminal investigation objectives. Similarly, in the private sector, these systems may be used in to facilitate functions including credit card fraud prevention or personal identity theft prevention. Generally, in these and other applications, fingerprint verification and identification is critical to effective security procedures.

In many examples, such fingerprint verification and identification operations incorporate a two-stage automatic fingerprint matching system. The first stage is known as a registration stage or, alternately, an enrollment stage. The second stage is known as a matching stage or, alternately, a verification stage or an authentication stage. The registration stage often involves registering fingerprints and associated identifiers into the automatic fingerprint matching system. An automatic ruler detection system then scales the fingerprints to a standard resolution and extracts features (e.g., fingerprint characteristics) and a set of minutiae, which are then recorded into a file record that is used in the second stage (i.e., the matching stage).

The scaling of fingerprints to a standard resolution involves initially determining the resolution of the underlying fingerprints. This determination is often performed manually and further requires significant time to conduct. In contrast, the matching stage is highly automated and may occur in real-time. For instance, a ten-print match (e.g., a match based on ten or fewer fingerprints) may occur in seconds or minutes. However, due to the significant time incurred in determining fingerprint resolutions, it is frequently not possible to complete both stages in real-time when the fingerprint resolution must be determined. Thus, there is an existing need for a method of determining resolutions to make it possible to expedite the process of two-stage fingerprint matching.

System Architecture

Figure 1:
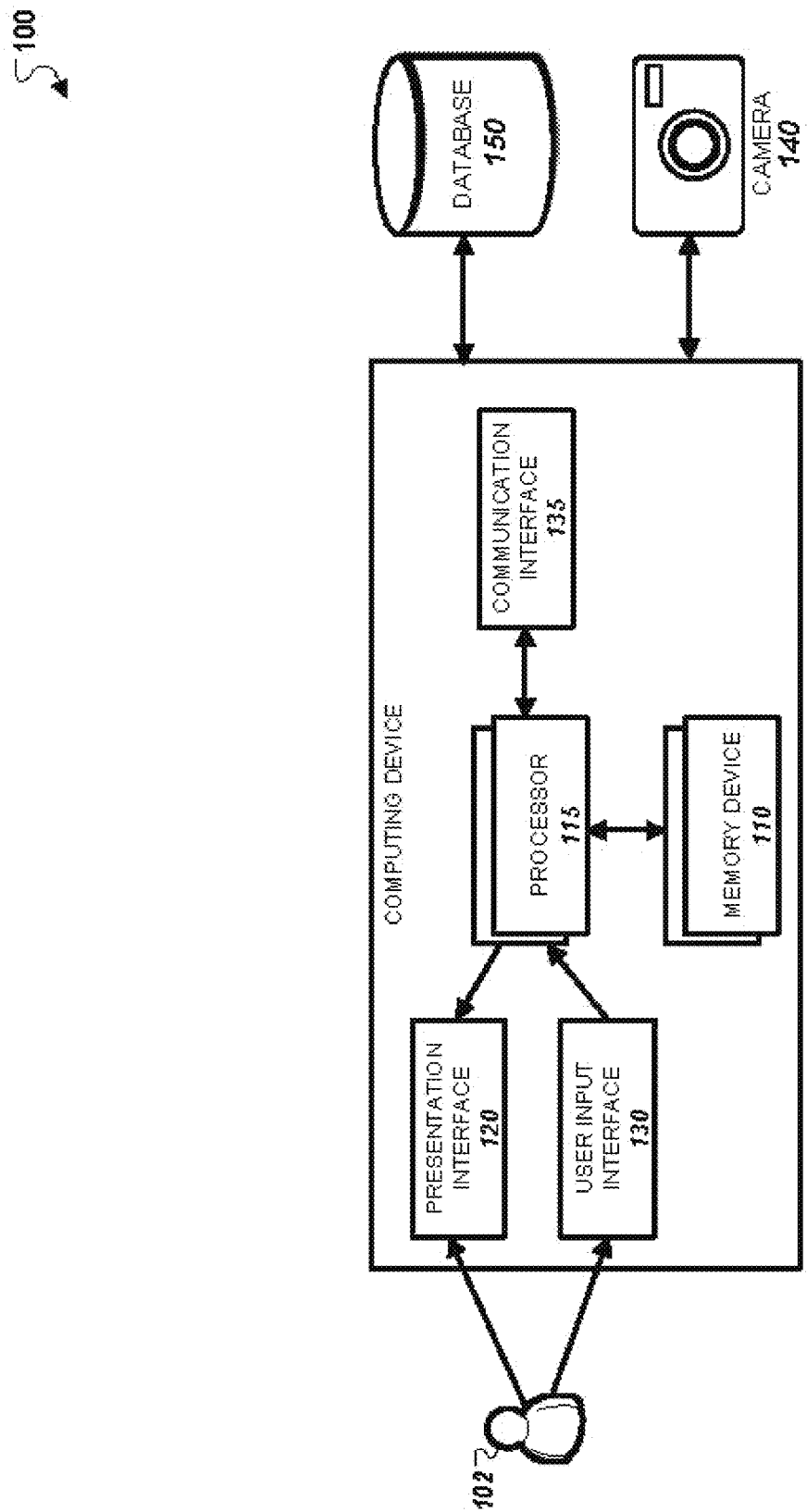
FIG. 1 is a block diagram of an exemplary automatic ruler detection system.

FIG. 1 is a block diagram of an exemplary automatic ruler detection system 100 that may be used in ruler detection and, more generally in fingerprint identification, fingerprint verification, fingerprint matching, and related processes described. In some implementations, the automatic ruler detection system 100 may be configured to execute the methods described throughout this specification. Alternatively, in other implementations, any suitable computer architecture that enables operation of the systems described may also be used.

The automatic ruler detection system 100 may include a memory device 110 and a processor 115 operatively coupled to memory device 110 for executing instructions. In some implementations, the executable instructions are stored in the memory device 110. The automatic ruler detection system 100 may be configurable to perform one or more operations using the programming processor 115. For example, the processor 115 may be programmed by encoding an operation as one or more executable instructions and providing the executable instructions on the memory device 110. The processor 115 may include one or more processing units, e.g., without limitation, in a multi-core configuration.

The memory device 110 may be one or more devices that enable storage and retrieval of information such as executable instructions and/or other data. The memory device 110 may include, for example, one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

In some implementations, the memory device 110 may be configured to store a variety of data associated with the systems described including, for example, ruler descriptions, edge pixel map algorithms, orientation map algorithms, edge pixel grouping algorithms, gradient algorithms, ruler extraction algorithms, ruler regularity algorithms, fingerprint resolution analysis algorithms, matching algorithms, scoring algorithms, scoring thresholds, perturbation algorithms, and fusion algorithms. Further, the memory device 110 may be configured to store any suitable data to facilitate the methods described throughout this specification.

In some implementations, automatic ruler detection system 100 includes a presentation interface 120 coupled to the processor 115. The presentation interface 120 may present information, such as a user interface showing data related to fingerprint matching, to a user 102. For example, the presentation interface 120 may include a display adapter (not shown) that may be coupled to a display device (not shown), such as a cathode ray tube (CRT), a liquid crystal display (LCD), an organic LED (OLED) display, and/or a hand-held device with a display. In some implementations, the presentation interface 120 includes one or more display devices. In addition, or alternatively, the presentation interface 120 may include an audio output device (not shown), e.g., an audio adapter and/or a speaker.

In some implementations, automatic ruler detection system 100 includes a user input interface 130. For instance, the user input interface 130 may be coupled to processor 115 and receives input from the user 102. The user input interface 130 may include, for example, a keyboard, a pointing device, a mouse, a stylus, and/or a touch sensitive panel, e.g., a touch pad or a touch screen. A single component, such as a touch screen, may function as both a display device of the presentation interface 120 and the user input interface 130.

A communication interface 135 may be coupled to processor 115 and configured to be coupled in communication with one or more other devices such as, without limitation, another computing system including, but not limited to, a camera 140, cameras, and other devices that may be used to provide biometric information such as sample images including fingerprints to the automatic ruler detection system 100. Such biometric systems including camera 140 and devices may be used to scan previously captured fingerprints or other image data or to capture live fingerprints from subjects. The communication interface 135 may include, without limitation, a wired network adapter, a wireless network adapter, a mobile telecommunications adapter, a serial communication adapter, and/or a parallel communication adapter. The communication interface 135 may receive data from and/or transmit data to one or more remote devices. The automatic ruler detection system 100 may be web-enabled for remote communications, for example, with a remote desktop computer (not shown).

In addition, the presentation interface 120 and/or the communication interface 135 may both be capable of providing information suitable for use with the methods described throughout this specification, e.g., to the user 102 or another device. For example, the presentation interface 120 and communication interface 135 may be used to as output devices. Similarly, the user input interface 130 and the communication interface 135 are capable of receiving information suitable for use with the methods described herein and may be referred to as input devices.

Further, the processor 115 and/or the memory device 110 may also be operatively coupled to a database 150. The database 150 may be any computer-operated hardware suitable for storing and/or retrieving data, such as, without limitation, pre-processed fingerprints, processed fingerprints, normalized fingerprints, extracted features, extracted and processed feature vectors such as octant feature vectors (OFVs), threshold values, fusion algorithms, scoring algorithms, and matching algorithms. In some implementations, the database 150 is integrated to the automatic ruler detection system 100. For example, the automatic ruler detection system 100 may include one or more hard disk drives the represent the database 150. For example, the database 150 may include multiple storage units such as hard disks and/or solid state disks in a redundant array of inexpensive disks (RAID) configuration. The database 150 may include a storage area network (SAN), a network attached storage (NAS) system, and/or cloud-based storage. Alternatively, the database 150 may be externally configured to the automatic ruler detection system 100, and may be accessed by a storage interface (not shown).

Automatic Ruler Detection System Overview

In general, ruler detection may be performed to facilitate a particular fingerprint identification, verification, or matching operation by an automatic fingerprint identification system. The automatic fingerprint identification system includes two stages: (1) an enrollment stage, and (2) an identification/verification stage.

To reliably and accurately match two fingerprints using the two-stage system, the resolution of the images containing the fingerprints may be initially determined. For instance, a camera may capture the fingerprint images, which include a ruler or other mensuration reference device. The mensuration reference device may be used to determine the resolution of the image by comparing known distances associated reference marks on the device to respective pixel locations of the reference marks within the images. In some examples, the known distances may be measured in standard units such as centimeter or inch formats.

Figure 2:
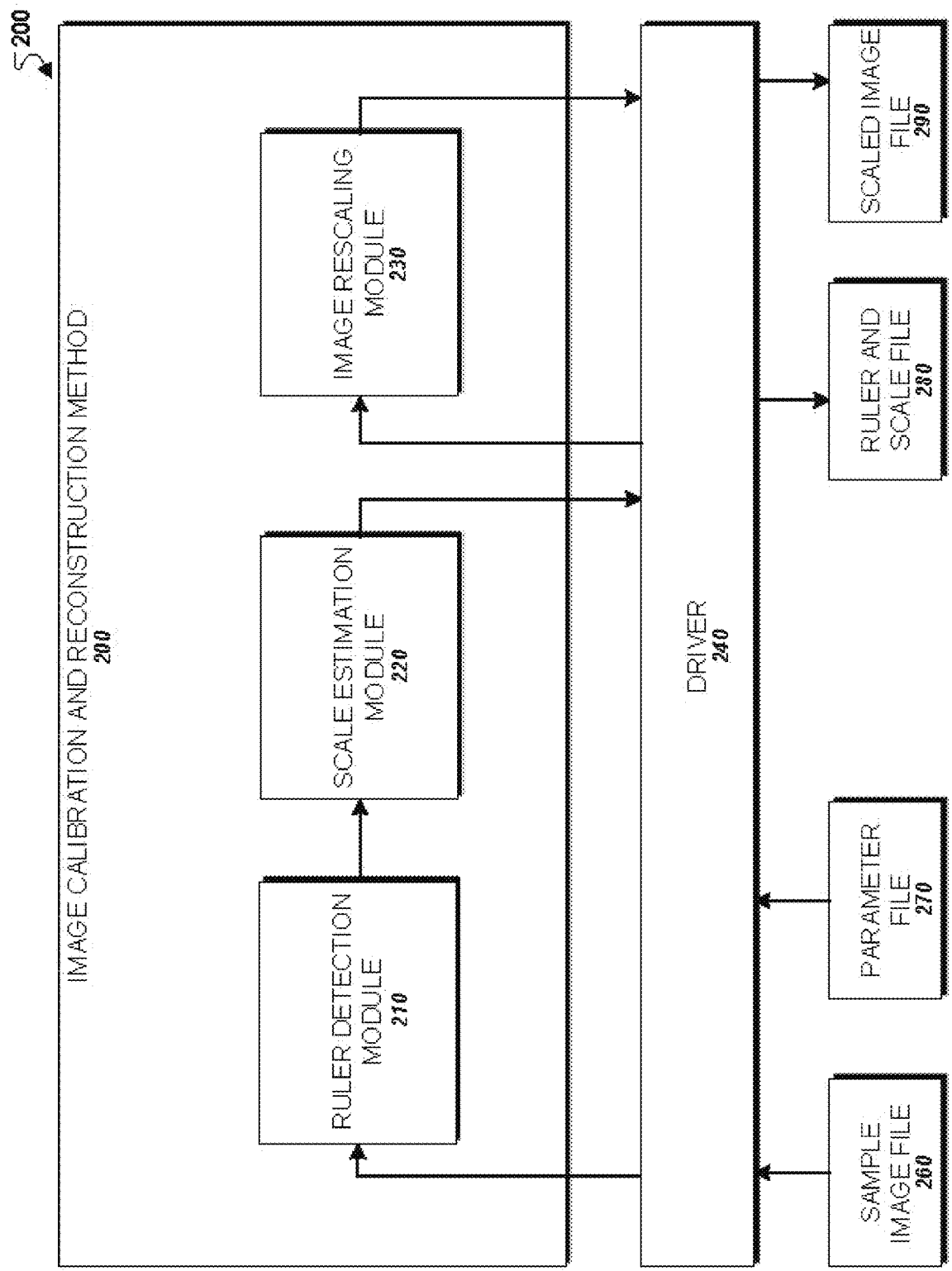
FIG. 2 is an exemplary process of image calibration and reconstruction.

FIG. 2 is an exemplary process 200 of image calibration and reconstruction. For instance, in some implementations, the automatic ruler detection system 100 is to be used to perform image calibration and reconstruction 200 and, more specifically, to determine fingerprint resolution and rescale fingerprints. The image calibration and reconstruction method 200 may include three modules: (1) a ruler detection module 210, (2) a scale estimation module 220, and (3) an image rescaling module 230. As depicted, the modules 210, 220, and 230 and an associated driver 240 may be implemented on the automatic ruler detection system 100.

A sample image 260 and a parameter file 270 may be provided to the automatic ruler detection system 100 using the driver 240. For instance, the sample image 260 may contain a fingerprint and at least one ruler (or mensuration reference device) that are used by systems to determine the resolution of a sample image 260. The parameter file 270 may include specifications that are used in executing the modules 210, 220, and 230 including, for example, units of scale and descriptions of ruler types that are expected to be detected within the sample image 260.

The ruler detection module 210 may identify the ruler (or mensuration reference device) contained within the sample image 260 using the methods described throughout this specification. In addition, the scale estimation module 220 may extract features to compute a scale based on the sample image 260 and the parameters 270. In this regard, the modules 210 and 220 may provide data to driver 240 that is used to generate the ruler and a scale file 280. For instance, such data may be used to rescale the sample image 260 by applying image rescaling module 230 and thereby generating a scaled image 290.

Figure 3:
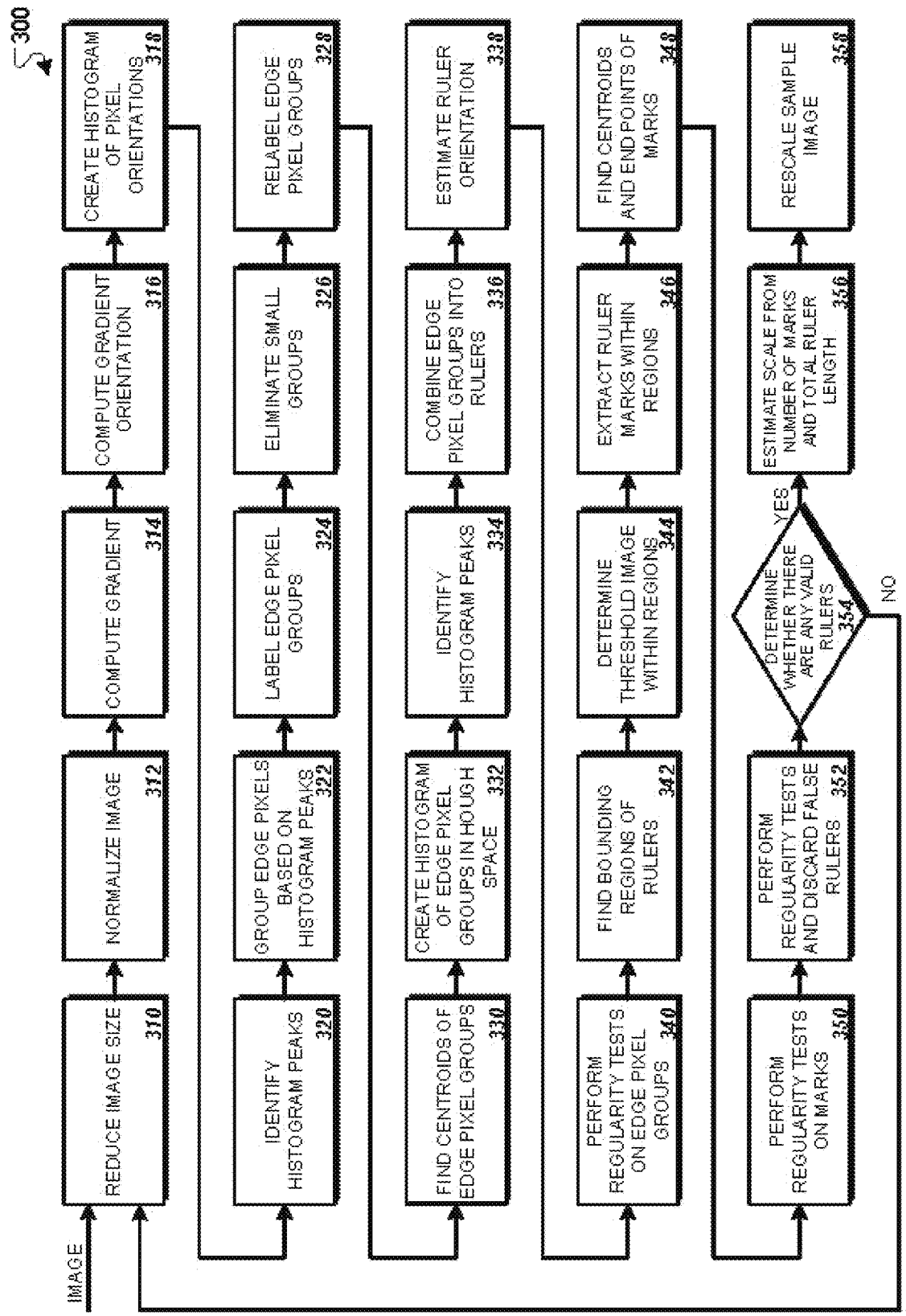
FIG. 3 is an exemplary process of ruler detection and scale estimation.

FIG. 3 is an exemplary process 300 of ruler detection and scale estimation. For instance, the process 300 may be performed by the modules 210 and 220 as described with respect to FIG. 2. More specifically, in some implementations, the automatic ruler detection system 100 may perform ruler detection and the process 300.

Figure 4A:
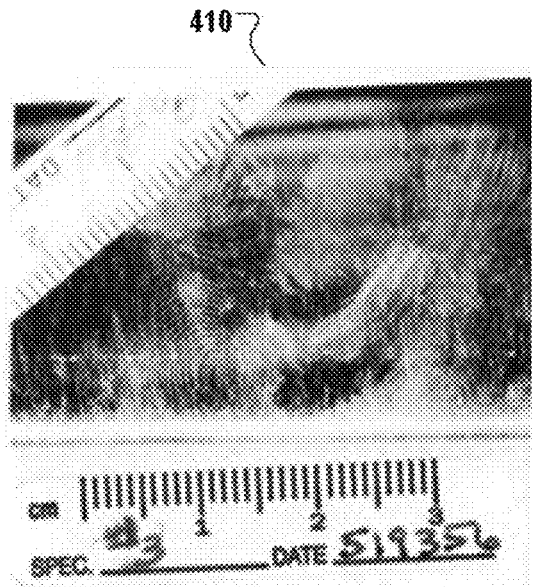
FIG. 4A is an exemplary sample image including rulers.
Figure 4B:
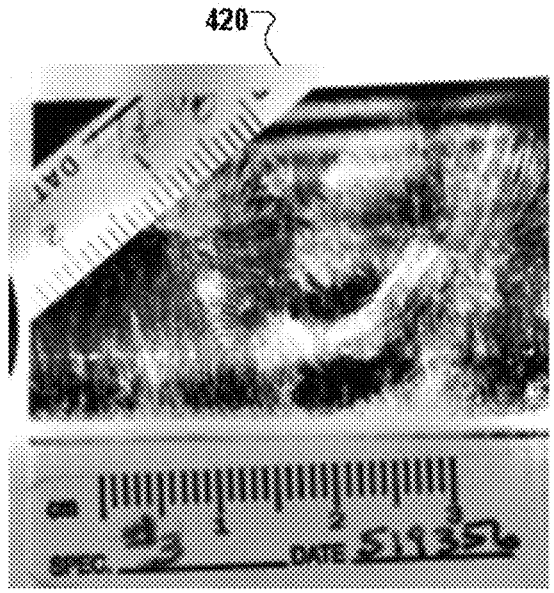
FIG. 4B is a normalized image derived from an exemplary sample image.

Initially, the file size of the sample image 260 may initially be reduced in order to improve the speed of process 300 (310). The sample image may then be normalized and/or enhanced by locally adjusting mean brightness and variability (312) and thereby improving the ability to compute a gradient of the sample image 260 (314). An exemplary sample image 260 is depicted in FIG. 4A as sample image 410. In contrast, a normalized version of the sample image 410 is shown in FIG. 4B as normalized image 420. As depicted, the contrast and image quality of normalized image 420 provides for easier detection of the rulers within the normalized image 420 compared to detection of the rules within the sample image 410.

The gradient images of the sample image 260 may be computed by the automatic ruler detection system 100 to extract information from sample image 260 (314). For example, the gradient images may be computed by convolving the sample image with a filter, such as a Sobel filter. Alternately, any suitable method of computing may also be used. The gradient image includes a plurality of pixels such that each pixel of the gradient image measures the change in intensity of a corresponding point in the original image in a given direction. For a two-dimensional image, gradient images are computed with respect to the x and y directions.

The gradient image may be used to facilitate edge detection and edge pixel analysis within the sample image 260. For instance, after gradient images have been computed, pixels with large gradient values may be identified as candidate edge pixels. The pixels with the largest gradient values in the direction of the gradient are then designated as edge pixels, and edges may be traced in the direction perpendicular to the gradient direction.

Figure 4C:
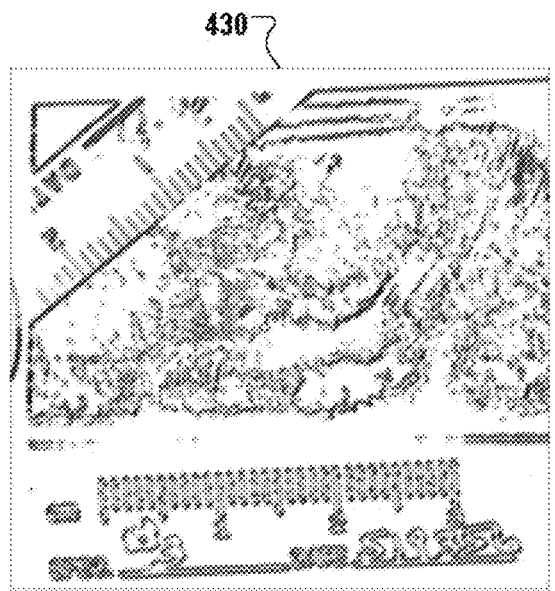
FIG. 4C is a processed image reflecting orientation data derived from an exemplary sample image.

The automatic ruler detection system 100 may then compute a gradient orientation based on the computed gradient images (316). For instance, after computing the gradient images and the gradient orientation, the automatic ruler detection system 100 may compute an edge pixel map that includes a plurality of edge pixels from the sample image 260 and may also compute an orientation map associated with the edge pixel map from the sample image 260. The orientation map defines an orientation for each edge pixel included in the orientation map. For example, FIG. 4C depicts a processed image 430, which displays an exemplary orientation map for the sample image 410 and the normalized image 420.

Figure 5:
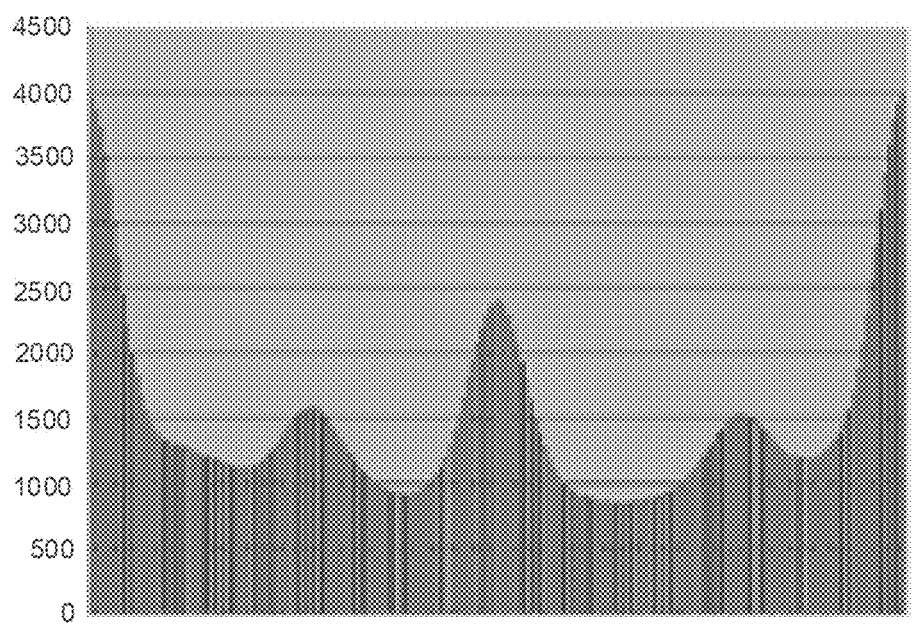
FIG. 5 is an orientation histogram based on the orientation data derived from an exemplary sample image.

The automatic ruler detection system 100 may group the edge pixels identified in the edge pixel map into edge groups corresponding to mark edges using orientation and connected components. More specifically, the automatic ruler detection system 100 may create a histogram of pixel orientations (318). For example, FIG. 5 depicts an exemplary histogram 500. In some implementations, determining the histogram of pixel orientations additionally includes smoothing the orientation histogram.

The automatic ruler detection system 100 may then identify histogram peaks within the histogram of pixel orientations (320). For instance, the automatic ruler detection system 100 may determine an interval centered at each peak of the determined histogram. In some implementations, the interval is determined based on the total number of orientations computed for sample image 260.

Figure 4D:
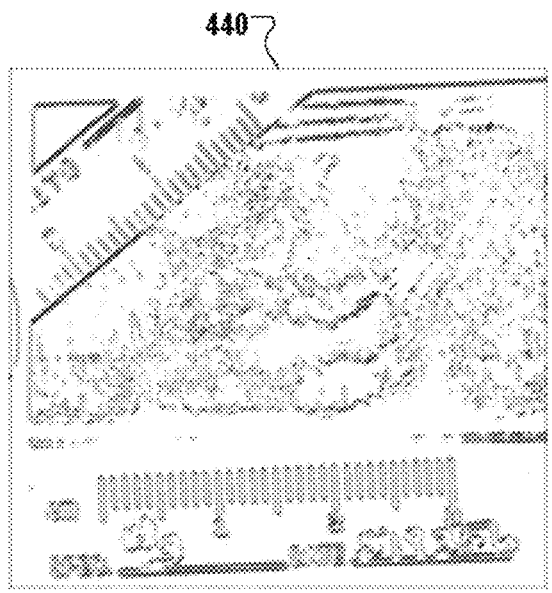
FIG. 4D is a processed image reflecting edge candidate groups derived from an exemplary sample image.
Figure 6:
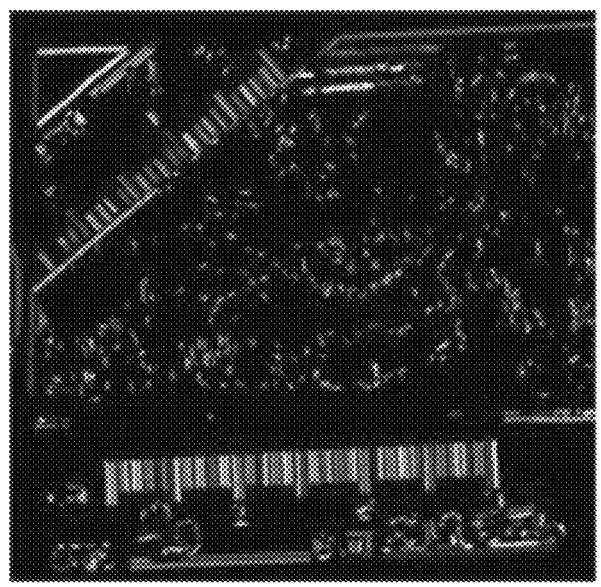
FIG. 6 is a processed image reflecting edge candidate groups derived from an exemplary sample image.

The automatic ruler detection system 100 may then group the edge pixels based on the identified histogram peaks (322). For example, as depicted in FIG. 4D, the processed image 440 includes grouped edge pixels. The automatic ruler detection system 100 may then label the edge pixels that have similar orientation values using connected component labeling in order to label edge pixel groups (324), eliminate small edge pixel groups (326), and relabel the edge pixel groups with small edge pixel groups removed (328). For example, as depicted in FIG. 6, small edge pixel groups may be been removed from the processed image 440 to generate the processed image 600. The automatic ruler detection system 100 may then find centroids of the edge pixel groups (330).

Figure 7:
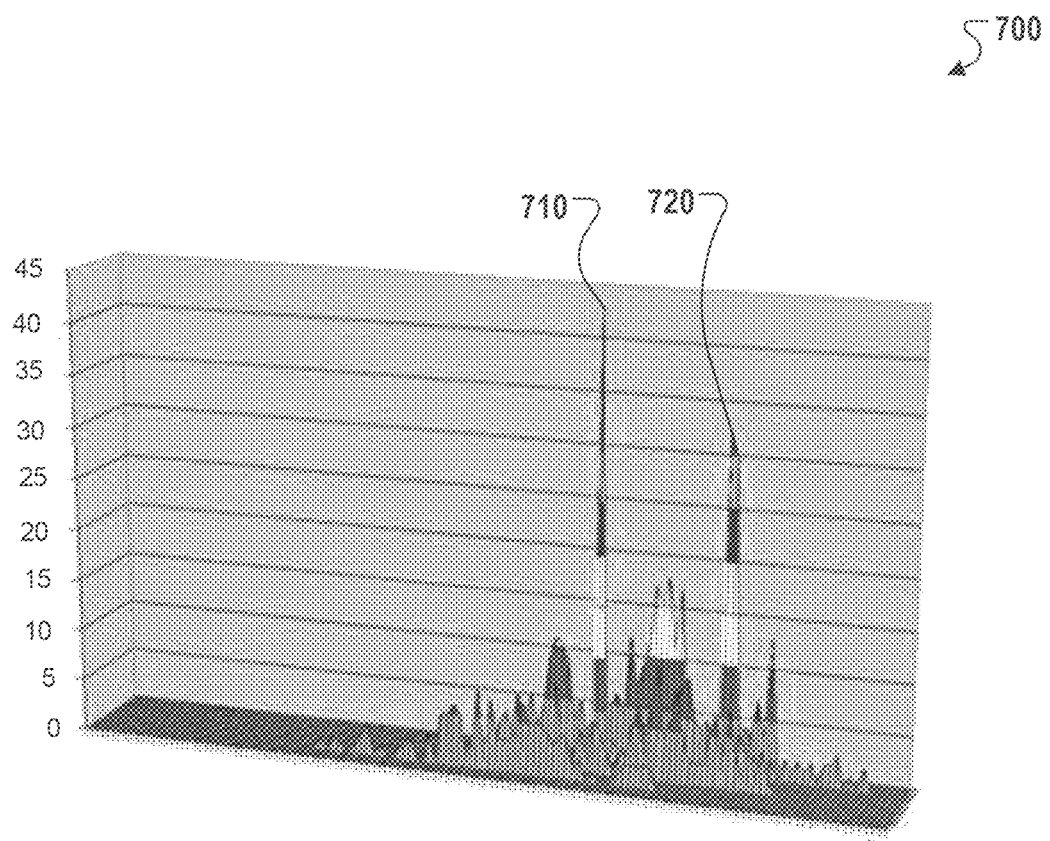
FIG. 7 is a histogram in Hough space derived from an exemplary sample image.

The automatic ruler detection system 100 may then create a histogram of the radius and orientation of each edge pixel group in a Hough space based on the calculated radii and orientations of a plurality of groups (332). For example, FIG. 7 depicts an exemplary histogram 700 in Hough space where the width of the histogram peaks (e.g., along the x-axis) indicates radius, the depth of the histogram peaks (e.g., along the z-axis) indicates angle, and the height of the histogram peaks (e.g., along the y-axis) indicates bin count (e.g., the number of matching pixels).

The automatic ruler detection system 100 may then identify histogram peaks from the Hough space radius and orientation histogram (334), and combine the edge pixel groups into ruler candidate groups (336). For example, in the exemplary histogram 700 in FIG. 7, peaks 710 and 720 indicate regions that contain rulers while lower peaks do not. Depending on specified parameter files 270, as previously described with respect to FIG. 2, the automatic ruler detection system 100 may identify different numbers of histogram peaks.

The automatic ruler detection system 100 may further determine a region containing the ruler by analyzing the ruler candidate groups. For instance, the automatic ruler detection system 100 may estimate the orientation of each ruler candidate group (338), perform regularity tests on the edge pixels of each ruler candidate group to discard false mark edges included in the ruler candidate groups (340), and determine a region of interest or a bounding region for each ruler candidate group (342). Determining the region of interest may be performed by using ruler coordinates in x-y coordinate space and rejecting outliers. In general, the automatic ruler detection system 100 identifies rulers by identifying patterns of short parallel marks that recur at a regular distance interval. In this regard, the automatic ruler detection system 100 may determine whether a threshold image satisfies one or more conditions based on patterns that are detected within the regions of interest (344).

The automatic ruler detection system 100 may compute a scale and verify that the determined scale is valid based on the number of marks and total ruler length. For instance, computing the scale may be accomplished using the scale estimation module 220 as described previously with respect to FIG. 2. In some implementations, estimating the scale may include extracting parallel lines (or "tick marks") from the ruler candidates, or alternately applying a Fourier transformation.

The automatic ruler detection system 100 may also validate that the threshold ruler is within the regions of interest (344), and extract ruler marks from within the regions (346), further find centroids and end points from the extracted marks (348). The automatic ruler detection system 100 may then perform regularity tests on the extracted marks to verify that the extracted marks conform to typical ruler descriptions (e.g., repeated and normal parallel lines corresponding to typical ruler types) (350). The automatic ruler detection system 100 may also perform regularity tests to discard false rulers (352). The false rulers that are discarded may be those rulers that do not conform to the ruler definitions identified within the automatic ruler detection system 100 (e.g., standard metric or standard rulers). For instance, rulers may conform to a standard number of parallel line segments of fixed length and fixed alignment in a repeated pattern. In this regard, rulers may be identified based on conformity to a set of expected repeated patterns. For example, distracting patterns (e.g., patterns that may trigger a false positive while not representing valid rulers) including background text in the image or elements of fingerprints may be rejected.

The automatic ruler detection system 100 may determine whether there are any valid rulers (354). For instance, the automatic ruler detection 100 may make the determination based on the results of the regularity tests or the detection of false rulers. For example, if no valid rulers are identified, the process 300 may be reset and returned to step 310 while processing the image at a higher resolution than was previously used after the initial step 310.

Alternatively, if valid rulers have been identified, the automatic ruler detection system 100 may estimate a scale based on the number of marks and type of ruler specified (356). For example, in the case of a standard ruler with tick marks separated by $\frac{1}{8}^{th}$ of an inch, the number of tick marks can be compared to their separation in pixels to recover the resolution in pixels per inch. In some implementations, estimating the scale includes performing a Fast Fourier Transform to estimate the frequency of edge space and determine the scale of the ruler candidates.

The automatic ruler detection system 100 may then rescale or resample the sample image (358). For instance, the automatic ruler detection system 100 may use the scale (or resolution) of the sample image to generate a scaled image.

In some implementations, the automatic ruler detection system 100 may use the image rescaling module 230, as described previously with respect to FIG. 2, to rescale or resample the sample image and thereby generate the scaled image. For example, the automatic ruler detection system 100 may apply any suitable image processing technique such as, for example, resampling, bilinear interpolation, bi-cubic interpolation, or Lanczos interpolation, to rescale the sample image. In such examples, the image rescaling module 230 may select a particular image processing technique based on the speed and accuracy requirements for a particular application of the sample image. In one example, resampling may be used by the image rescaling module 230 to provide a fast and simple implementation. In another example, a rescaling scheme may be used the image rescaling module 230 to preserve useful spatial information within the sample image.

In some implementations, the automatic ruler detection system 100 may apply a quality metric model to determine whether the ruler detection processes, as described with respect to FIGS. 2-3, need to be iteratively performed to achieve higher accuracy after rescaling or after enhancing the sample image using different methods or parameters. For example, a quality metric may be determined using the evenness of the distances between the reference marks of the rulers and comparing the evenness of the distances to the expected evenness based on previous results obtained that are designated to represent satisfactory performance. In other instances, the quality metric may also be determined based upon the contrast of the detected ruler area.

Figure 8:
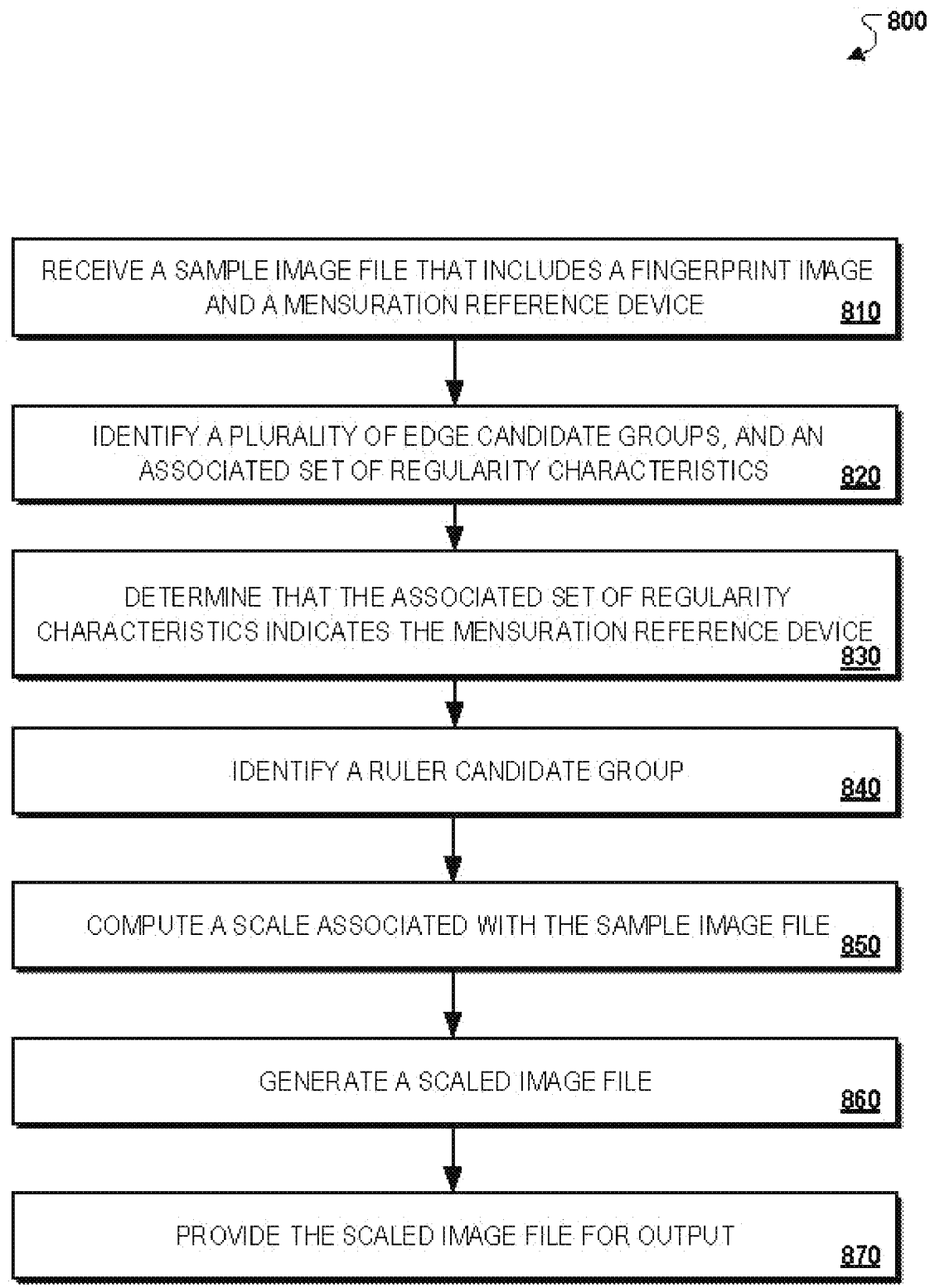
FIG. 8 is an exemplary method of ruler detection and scale estimation.

FIG. 8 is an exemplary process 800 of ruler detection and scale estimation. In some implementations, the process 800 may be implemented by the automatic ruler detection system 100 as discussed with respect to FIG. 1. Briefly, the process 800 may include receiving a sample image that includes a fingerprint image and a mensuration reference device (810), identifying a plurality of edge candidate groups, and an associated set of regularity characteristics (820), determining that the associated set of regularity characteristics indicates the mensuration reference device (830), identifying a ruler candidate group (840), computing a scale associated with the sample image (850), generating a scaled image (860), and providing the scaled image for output (870).

In more detail, the process 800 may include receiving a sample of image that includes a fingerprint image and a mensuration reference device (810). For instance, the automatic ruler detection system 100 may receive a sample image from a scanning device. In some implementations, the sample image includes a fingerprint image and a mensuration reference device. The sample image is associated with a first resolution.

In some implementations, the automatic ruler detection system 100 also computes an edge pixel map including a plurality of edge pixels from the sample image and an orientation map associated with the edge pixel map from the sample image. The orientation map may define an orientation for each edge pixel included in the orientation map.

The process 800 may include identifying a plurality of edge candidate groups, and an associate set of regularity characteristics (820). For instance, the automatic ruler detection system 100 may aggregate the plurality of edge pixels into a plurality of edge candidate groups based at least partially on the associated orientation of each edge pixel and further identify a set of regularity characteristics associated with each of the plurality of edge candidate groups.

The process 800 may include determining that the associated set of regularity characteristics indicates the mensuration reference device (830). For instance, the ruler detection system 100 may determine that the associated set of regularity characteristics indicates the mensuration reference device of the sample image.

The process 800 may include identifying a ruler candidate group (840). For instance, the ruler detection system 100 may identify a ruler candidate group based on determining that the associated set of regularity characteristics indicates the mensuration reference device of the sample image.

The process 800 may include computing a scale associated with the sample image (850). For instance, the automatic ruler detection system 100 may extract a set of ruler marks from the identified ruler candidate groups and compute a scale associated with the sample image.

In some implementations, the automatic ruler detection system 100 may adjust the baseline resolution of the sample image based on the computed scale associated with the sample image. For instance, the scale may be applied to the baseline resolution to compute an adjusted resolution for a scaled image.

The process 800 may include generating a scaled image (860). For instance, the automatic ruler detection system 100 may generate the scaled image based on the adjusted resolution.

The process 800 may include providing the scaled image for output (870). For instance, the automatic ruler detection system 100 may provide the scaled image for output to an automatic fingerprint identification system, which may then be used to perform a particular fingerprint matching or identification operation.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that ruler as used herein means any mensuration reference device that includes visible marks used for measuring length between two reference points.

It should be understood that camera as used herein means any optical instrument used for recording images, which may be stored locally, transmitted to another device, or both. Camera may include digital cameras, film cameras, scanners, and the like.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   obtaining an edge candidate group within an orientation map of an image that includes a fingerprint and a mensuration reference device, wherein edge pixels of the edge candidate group have a matching orientation;
   identifying a set of regularity characteristics of the edge candidate group within the orientation map of the image that includes the fingerprint and the mensuration reference device;
   determining that the set of regularity characteristics match a set of reference regularity characteristics associated with the mensuration reference device;
   predicting a set of ruler marks from the edge candidate group based on the determining that the set of regularity characteristics match the set of reference regularity characteristics associated with the mensuration reference device; and
   providing the set of ruler marks for output.

2. The method of claim 1, further comprising:
   computing an orientation histogram based on the orientation map;
   identifying a plurality of matching orientations within an interval centered at a peak of the orientation histogram; and
   generating a plurality of edge candidate groups using edge pixels corresponding to the identified plurality of matching orientations.

3. The method of claim 2, wherein the interval centered at the peak of the orientation histogram is defined based at least on a number of orientations represented within the orientation map.

4. The method of claim 1, wherein determining that the set of regularity characteristics match the set of reference regularity characteristics associated with the mensuration reference device comprises:
   obtaining a plurality of descriptions for a ruler; and
   determining that the edge candidate group includes a valid ruler based at least on the plurality of descriptions for the ruler.

5. The method of claim 1, wherein predicting a set of ruler marks from the edge candidate group comprises:
   estimating a ruler orientation described in the edge candidate group;
   performing one or more regularity tests on the set of ruler marks the ruler orientation;
   identifying one or more false marks within the set of rule marks based on performing the one or more regularity tests; and
   removing the one or more false marks from the set of ruler marks.

6. The method of claim 1, further comprising:
   generating a gradient image of the image that includes a fingerprint and a mensuration reference device, wherein:
      the gradient image comprises a plurality of pixels, and
      each pixel included in the plurality of pixels is associated with a gradient value representing a respective change in pixel intensity of a corresponding pixel in the image with respect to neighboring pixels along an x-direction and neighboring pixels along a y-direction; and
   wherein the orientation map is generated based on the gradient image.

7. The method of claim 6, further comprising:
   identifying a quality metric that defines a minimum level of gradient quality for the gradient image;
   determining a gradient quality value associated with the gradient image; and
   determining that the gradient value satisfies the quality metric.

8. A system comprising:
   one or more computing devices; and
   one or more storage devices storing instructions that, when executed by the one or more computing devices, cause the one or more computing devices to perform operations comprising:
      obtaining an edge candidate group within an orientation map of an image that includes a fingerprint and a mensuration reference device, wherein edge pixels of the edge candidate group have a matching orientation;
      identifying a set of regularity characteristics of the edge candidate group within the orientation map of the image that includes the fingerprint and the mensuration reference device;
      determining that the set of regularity characteristics match a set of reference regularity characteristics associated with the mensuration reference device;
      predicting a set of ruler marks from the edge candidate group based on the determining that the set of regularity characteristics match the set of reference regularity characteristics associated with the mensuration reference device; and
      providing the set of ruler marks for output.

9. The system of claim 8, wherein the operations further comprise:
   computing an orientation histogram based on the orientation map;

identifying a plurality of matching orientations within an interval centered at a peak of the orientation histogram; and generating a plurality of edge candidate groups using edge pixels corresponding to the identified plurality of matching orientations.

10. The system of claim 9, wherein the interval centered at the peak of the orientation histogram is defined based at least on a number of orientations represented within the orientation map.

11. The system of claim 8, wherein determining that the set of regularity characteristics match the set of reference regularity characteristics associated with the mensuration reference device comprises:

obtaining a plurality of descriptions for a ruler; and determining that the edge candidate group includes a valid ruler based at least on the plurality of descriptions for the ruler.

12. The system of claim 8, wherein predicting a set of ruler marks from the edge candidate group comprises:

estimating a ruler orientation described in the edge candidate group;

performing one or more regularity tests on the set of ruler marks the ruler orientation;

identifying one or more false marks within the set of rule marks based on performing the one or more regularity tests; and removing the one or more false marks from the set of ruler marks.

13. The system of claim 8, wherein the operations further comprise:

generating a gradient image of the image that includes a fingerprint and a mensuration reference device, wherein:

the gradient image comprises a plurality of pixels, and each pixel included in the plurality of pixels is associated with a gradient value representing a respective change in pixel intensity of a corresponding pixel in the image with respect to neighboring pixels along an x-direction and neighboring pixels along a y-direction; and wherein the orientation map is generated based on the gradient image.

14. The system of claim 13, wherein the operations further comprise:

identifying a quality metric that defines a minimum level of gradient quality for the gradient image;

determining a gradient quality value associated with the gradient image; and determining that the gradient value satisfies the quality metric.

15. At least one non-transitory computer-readable storage device encoded with instructions that, when executed by one or more computing devices, cause the one or more computing devices to perform operations comprising:

obtaining an edge candidate group within an orientation map of an image that includes a fingerprint and a mensuration reference device, wherein edge pixels of the edge candidate group have a matching orientation;

identifying a set of regularity characteristics of the edge candidate group within the orientation map of the image that includes the fingerprint and the mensuration reference device;

determining that the set of regularity characteristics match a set of reference regularity characteristics associated with the mensuration reference device;

predicting a set of ruler marks from the edge candidate group based on the determining that the set of regularity characteristics match the set of reference regularity characteristics associated with the mensuration reference device; and providing the set of ruler marks for output.

16. The non-transitory computer-readable storage device of claim 15, wherein the operations further comprise:

computing an orientation histogram based on the orientation map;

identifying a plurality of matching orientations within an interval centered at a peak of the orientation histogram; and generating a plurality of edge candidate groups using edge pixels corresponding to the identified plurality of matching orientations.

17. The non-transitory computer-readable storage device of claim 16, wherein the interval centered at the peak of the orientation histogram is defined based at least on a number of orientations represented within the orientation map.

18. The non-transitory computer-readable storage device of claim 15, wherein determining that the set of regularity characteristics match the set of reference regularity characteristics associated with the mensuration reference device comprises:

obtaining a plurality of descriptions for a ruler; and determining that the edge candidate group includes a valid ruler based at least on the plurality of descriptions for the ruler.

19. The non-transitory computer-readable storage device of claim 15, wherein predicting a set of ruler marks from the edge candidate group comprises:

estimating a ruler orientation described in the edge candidate group;

performing one or more regularity tests on the set of ruler marks the ruler orientation;

identifying one or more false marks within the set of rule marks based on performing the one or more regularity tests; and removing the one or more false marks from the set of ruler marks.

20. The non-transitory computer-readable storage device of claim 15, wherein the operations further comprise:

generating a gradient image of the image that includes a fingerprint and a mensuration reference device, wherein:

the gradient image comprises a plurality of pixels, and each pixel included in the plurality of pixels is associated with a gradient value representing a respective change in pixel intensity of a corresponding pixel in the image with respect to neighboring pixels along an x-direction and neighboring pixels along a y-direction; and wherein the orientation map is generated based on the gradient image.

* * * * *